A. E. SLIPPER.
BELT FASTENER.
APPLICATION FILED DEC. 27, 1907.
925,521.
Patented June 22, 1909.
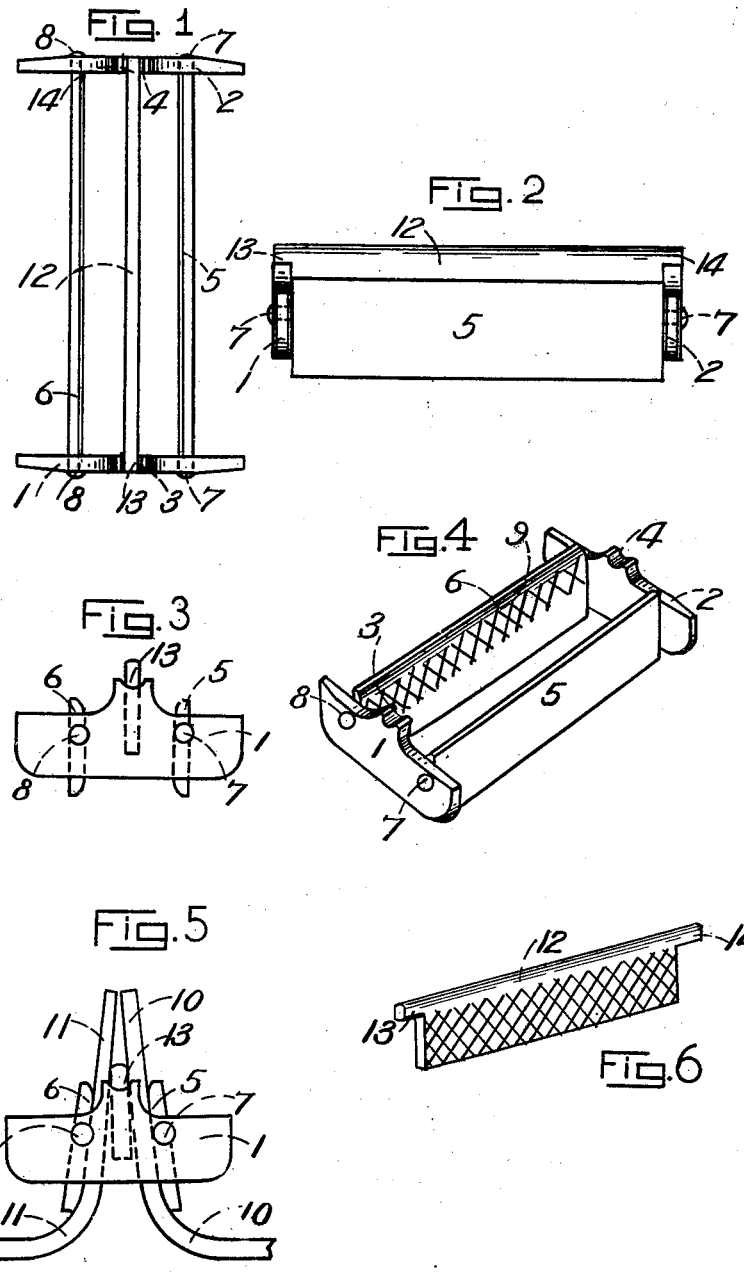

UNITED STATES PATENT OFFICE.

ALFRED ERNEST SLIPPER, OF KOKIRI, GREYMOUTH, NEW ZEALAND, ASSIGNOR OF ONE-HALF TO DAVID JOHN SMITH, OF KOKIRI, GREYMOUTH, NEW ZEALAND.

BELT-FASTENER.

No. 925,521.      Specification of Letters Patent.      Patented June 22, 1909.

Application filed December 27, 1907. Serial No. 408,252.

*To all whom it may concern:*

Be it known that I, ALFRED ERNEST SLIPPER, of Kokiri, Greymouth, New Zealand, sawmiller, have invented certain new and useful Improvements in Belt-Fasteners, of which the following is a specification.

This invention relates to belt fasteners of the kind in which the belt ends are secured between side plates pivoted to end plates or to a frame with or without a central cross bar extending between the belt ends.

Belt fasteners of the kind referred to have been devised in which the side plates are made with faces triangular in cross section, the sharp angular edges being opposed to the belt ends, and no cross bar being used; belt fasteners of the kind referred to have also been devised in which the side plates are made with curved faces opposed to belt ends either no cross bar being used, or a cross bar used extending between the belt ends above the gripping portions of the side plates; but such belt fasteners are not my invention.

According to my invention two flat sided plates are pivotally secured to end plates by pivots on and above the center of the side plates, a flat central plate provided with pivots at the ends of its upper edge being adapted to lie between the belt ends, so as to separate them, with the pivots resting on central notched portions in the end plates, as hereinafter set forth and pointed out in the claim.

It will be seen that in my invention the ends of the belt are not held, as in belt fasteners of similar type heretofore devised, by the ends of the belt being pressed together by the side plates, but that in my invention one end of the belt is gripped between the inner face of one pivoted flat-sided plate and one face of the pivoted flat central plate, and the other end of the belt is gripped between the inner face of the other pivoted flat-sided plate and the other face of the pivoted flat central plate. This arrangement prevents the slipping of the belt ends which is likely when they are pressed together, and the flat shape of the plates insures a smooth grip, while their pivotal relation to one another causes the whole of the parts to work smoothly together whichever way the strain comes.

My invention is illustrated in the accompanying drawings in which the same numerals of reference indicate the same parts and, Figure 1 is a plan of the belt fastener, Fig. 2 is a side view of the same. Fig. 3 is an end view of the same. Fig. 4 is a perspective view of the same with the central plate removed, Fig. 5 is an end view of the belt fastener in position on a belt. Fig. 6 is a perspective view of the central plate.

According to this invention there are two short vertical end plates (1) (2) having the central parts of their upper edges extending upwardly, and having notches (3) (4) formed thereon respectively. Two flat-sided plates (5) (6) lie between the end plates (1) (2) and are pivotally secured thereto by pivots (7) (8) formed integral with, and above the center of the side plates (5) (6) and passed through holes formed in the end plates and burred over to hold them in position. The side plates (5) (6) are rounded at their edges so as not to cut the belt when strained and their upper ends (9) are corrugated or roughened to grip the belt well. The ends (10) (11) of the belt to be fastened are passed up between the side plates (5) (6) and pulled through a short distance or sufficient to tighten the belt for the purpose in view. The central flat plate (12) is then dropped between the two belt ends (10) (11) so that it lies between them being supported by integral pivots (13) (14) at its ends respectively resting in the notches (3) (4) in the end plates (1) (2). The central flat plate (12) is roughened or corrugated on both sides see Fig. 6 to assist in effecting a tight grip. When the strain comes on the belt the pivoted flat sided plates (5) (6) jam the belt ends (10) (11) against the flat central plate (13) which separates the belt ends these being held securely as shown in Fig. 5.

Having now described my invention what I claim as new and desire to secure by Letters Patent is:—

A belt fastener comprising two end plates having the central part of their upper edges extending upwardly each of said extending portions having a notch therein, two flat side plates pivotally secured to the end plates, by pivots integral with and above the center of the side plates, and a flat central plate lying between said side plates and having pivots at its upper edge said pivots working in the notches in the extended portions, the belt ends being gripped between the inner faces of said side plates and the faces of said flat central plate substantially as described.

In witness whereof I have hereunto set my hand in presence of two witnesses.

ALFRED ERNEST SLIPPER.

Witnesses:
    E. B. WEBB,
    J. H. UPHAM.